US007499969B1

(12) United States Patent
van Os et al.

(10) Patent No.: US 7,499,969 B1
(45) Date of Patent: Mar. 3, 2009

(54) USER INTERFACE FOR MULTIWAY AUDIO CONFERENCING

(75) Inventors: Marcel van Os, San Francisco, CA (US); Gregory N. Christie, San Jose, CA (US); Scott Forstall, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 708 days.

(21) Appl. No.: 10/877,493

(22) Filed: Jun. 25, 2004

(51) Int. Cl.
*G06F 15/16* (2006.01)

(52) U.S. Cl. .................. 709/203; 709/217; 709/223; 709/231

(58) Field of Classification Search ............... 709/231, 709/203, 204, 208, 217, 219, 242; 345/700, 345/716, 723, 751, 753
See application file for complete search history.

(56) References Cited

U.S. PATENT DOCUMENTS

| | | | | |
|---|---|---|---|---|
| 5,859,663 A * | 1/1999 | Simon | ..................... | 348/14.07 |
| 5,867,653 A * | 2/1999 | Aras et al. | ................... | 709/204 |
| 6,157,401 A * | 12/2000 | Wiryaman | ............... | 348/14.09 |
| 6,237,025 B1 * | 5/2001 | Ludwig et al. | ............. | 709/204 |
| 6,288,753 B1 * | 9/2001 | DeNicola et al. | ............ | 348/586 |
| 6,304,648 B1 * | 10/2001 | Chang | .................... | 379/202.01 |
| 6,343,313 B1 * | 1/2002 | Salesky et al. | ............. | 709/204 |
| 6,457,043 B1 * | 9/2002 | Kwak et al. | ................. | 709/204 |
| 6,535,240 B2 * | 3/2003 | Yang et al. | ............... | 348/14.08 |
| 6,826,159 B1 * | 11/2004 | Shaffer et al. | ............... | 370/260 |
| 6,922,718 B2 * | 7/2005 | Chang | ........................ | 709/204 |
| 7,023,965 B2 * | 4/2006 | Oates | ....................... | 379/88.01 |
| 7,158,487 B1 * | 1/2007 | Klaghofer et al. | ........... | 370/261 |
| 7,305,078 B2 * | 12/2007 | Kardos | .................. | 379/202.01 |
| 7,313,593 B1 * | 12/2007 | Pulito et al. | ................. | 709/204 |
| 7,317,791 B2 * | 1/2008 | Carlson | ................ | 379/202.01 |
| 2003/0081751 A1 * | 5/2003 | Berstis | .................. | 379/202.01 |
| 2003/0182001 A1 * | 9/2003 | Radenkovic et al. | .......... | 700/94 |
| 2007/0165820 A1 * | 7/2007 | Krantz et al. | .......... | 379/202.01 |

FOREIGN PATENT DOCUMENTS

EP        1686835 A1 *   8/2006

OTHER PUBLICATIONS

"Apple Media Conference and Quick Time Conferencing", Apple Computer, Inc., 1995, pp. 1-2.
Beier, I. et al., "*GCSVA*- A Multiparty Videoconferencing System with Distributed Group and QoS Management", 7th International IEEE Conference on Computer Communications and Networks IC3N'98, Oct. 1998, pp. 1-7.

(Continued)

*Primary Examiner*—Lashonda T Jacobs
(74) *Attorney, Agent, or Firm*—Fenwick & West LLP (57) ABSTRACT

An audio conferencing client application provides a user interface that facilitates turn taking in both moderated and unmoderated audio conferences. The user interface provides each conference participant with the ability to set an icon that indicates a request to speak. This request state is propagated to the audio conferencing clients of all other participants, where each such audio conferencing client then displays a request icon associated with the requesting participant. Where multiple participants request to speak, their respective request icons can be numbered. In a moderated conference, a moderator can control which participants can speak, an make that decision in view of the outstanding requests and their order. The request icons can be dismissed either automatically or manually.

45 Claims, 4 Drawing Sheets

OTHER PUBLICATIONS

Dommel, HP et al., "Network Support for Turn-Taking in Multimedia Collaboration", Proceeding IS&T/SPIE Symposium on Electronic Imaging: Multimedia Computing and Networking 1997, Feb. 1997, San Jose, CA.

Dugelay, JC, et al., "Synthetic Natural Hybrid Video Proceedings for Virtual Teleconferencing Systems", IEEE Picture Coding Symposium, Apr. 21-23, 1999, Portland, Oregon, pp. 1-4.

Gemmell, J. et al., "Gaze Awareness for Video-Conferencing: A Software Approach," IEEE Multimedia, vol. 7, No. 4, Oct.-Dec., 2000, pp. 26-35.

Gonzalez, AJ, et al., "Audio Processing for Interactive Multimedia Communications", Old Dominion University Technical Report, TR 9801, Feb. 6, 1998, pp. 1-25.

Hardman, V. et al., "Successful Multiparty Audio Communication Over the Internet", Communications of the ACM, May 1998, vol. 41, No. 5, pp. 1-7.

Isaacs, E.A. et al., "Piazza: A Desktop Environment Supporting Impromptu and Planned Interactions," Proceedings of the 1996 ACM Conference on Computer Supported Cooperative Work, Boston, MA, Nov. 1996, pp. 315-324.

Isaacs, E.A., "A Forum for Supporting Interactive Presentations to Distributed Audiences", Proceedings of the 1994 ACM Conference on Computer Supported Cooperative Work, Univ. of North Carolina Chapel Hill, 1994, pp. 405-416.

Juby, B. et al., "Real-Time Speaker Identification and Participant Tracking in The Access Grid", In the Proceedings of 4th Annual Postgraduate Symposium on the Convergence of Telecommunications, Networking and Broadcasting (PG Net 2003), Liverpool, UK, pp. 313-319.

Liao, C., et al., "Shared Interactive Video for Teleconferencing", MM '03, ACM 1-58113-722-2/03/0011, Nov. 2-8, pp. 1-9.

Moors, T., "The SmartPhone: Interactive Group Audio with Complementary Symbolic Control", Distributed Communities on the Web: 4th International Workshop, DCW 2002, Sydney, Australia, Apr. 3-5, 2002, pp. 100-112.

Omnitronics Pty, LTD, "Brochure Technical Information Overview a 9412 AMU Audio Management Unit", pp. 1-25.

Taylor, M.J. et al., "Gaze Communication Using Semantically Consistent Spaces," Proceedings of the CHI '2000, ACM, Apr. 2000, The Hague, Netherlands, pp. 400-407.

Yang R., et al., "Eye Gaze Correction with Stereovision for Video-Teleconferencing", Univ. of North Carolina at Chapel Hill, Dept. Comp. Sci., Technical Report MSR-TR-2001-119, pp. 1-16.

* cited by examiner

USER INTERFACE FOR MULTIWAY AUDIO CONFERENCING

CROSS REFERENCE TO RELATED APPLICATION

The application is related to U.S. application Ser. No. 10/877,507, entitled "Mixed Media Conferencing," filed on Jun. 25, 2004, which is incorporated by reference herein.

FIELD OF THE INVENTION

The present invention relates generally to teleconferencing, and more specifically, to user interfaces providing information to participants in an audio teleconference using a computer.

BACKGROUND OF THE INVENTION

Audio teleconferencing is a widely used technology that allows multiple, remote individuals or groups to jointly engage in a conversation by telephone. Conventionally, teleconferencing was provided using a speakerphone that included both one or more speakers for outputting the voices of the remote participants and one or more microphones for receiving the voices of the local participants. In this configuration, there is no graphical user interface associated with the audio conferencing system. As a result, there are often difficulties in determining which remote speakers wish to speak next, and in the current speaker yielding to those individuals.

In face-to-face conversation, turn taking is based on largely non-verbal cues, including body positioning, eye contact, and physical indications between the speakers. Because there is no visual component to the audio conferencing, turn taking is typically based on waiting for a sufficient length of time after the other speaker has stopped talking to be sure that no one else is going to speak, and then speaking up. Or, a speaker simply has to interrupt another speaker in order to gain the floor. Which speakers feel able to interrupt others is heavily dependent on the organizational hierarchy and power relationships between the participants. Either of these approaches result in an inefficient and unnatural turn taking.

More recently, audio conferencing is now supported in conjunction with personal computers, which include a desktop audio conferencing client application, for example Apple Computer's Quicktime® conferencing client, and Microsoft Corp.'s NetMeeting® client. In these systems, the conferencing client is used to setup and establish an audio conference, encode and decode the audio data (e.g., using an H.323 codec), and transmit the data over a computer network. The user interface of these clients typically provide controls for dialing, muting, volume control, hanging up, looking up directory information, and establishing default preferences and parameters (e.g., local phone number, IP address, and so forth). However, during an actual audio conference, the user interface often provides little or no information that conveys the non-verbal social cues necessary for normal (e.g. face-to-face) turn taking behavior. In some audio conferencing a single "moderator" can control which individuals can speak at any given; but this type of imposed turn taking does not provide the same social dynamics as non-verbal cues present in natural conversations, which by and large are unmoderated.

Accordingly, there continues to be a need for audio conferencing applications that provide a user interface which supports non-verbal cues between a plurality of remote participants that allows for natural turn taking behavior between the participants as would be present in face-to-face dialogues.

SUMMARY OF THE INVENTION

An audio conferencing client application provides a user interface that facilitates turn taking in both moderated and unmoderated audio conferences. The user interface includes an interface element, such as an icon that indicates a request to speak. The request to speak is made by selecting the icon, or providing an equivalent user interface, such as a keystroke combination. An indicator of this request to speak is provided to the audio conferencing clients of the other conference participants. Each such audio conferencing client then displays a request icon associated with the requesting participant. The request icon is preferably displayed in proximity to the name or image of the requesting participant. In this manner, each participant, including a current speaker, is aware of which other participants desire to speak next. This allows each participant to better determine when it would be appropriate to begin speaking. Where multiple participants request to speak, their respective request icons in the various audio conferencing client user interfaces can be numbered. In a moderated conference, a moderator can control which participants can speak, and make that decision in view of the outstanding requests and their order. In either of these embodiments, another feature of the audio conferencing client is the ability to output an audio signal (e.g., a tone) in conjunction with displaying a request icon, thereby further indicating that a request to speak has been received.

The request icons can be dismissed either automatically or manually. The request icons can be dismissed automatically after predetermined amount of time, or after the associated participant begins speaking. A request icon can be dismissed either by removing it entirely, or by fading it away. The request icon can be displayed in response to the requesting participant making a continuous user input (e.g., holding down a mouse button or keystroke combination), and then removed when the input is terminated.

A separate aspect of the user interface, which is particularly useful in combination with the request icons, is a graphical audio speech indicator associated with each participant. Each such indicator graphically represents the audio signal level of the participant's speech. Thus, each participant can see how loudly or softly each other participant is speaking, and thereby better determine when it would be appropriate to begin speaking. The signal level meter is particularly useful in audio conferences with numerous participants, where a given participant may not be familiar with or recognize the voices of one or more of the other participants, or where it may be difficult to determine which of several different participants are currently speaking.

These features are not the only features of the invention. In view of the drawings, specification, and claims, many additional features and advantages will be apparent.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE INVENTION

Figure 1:
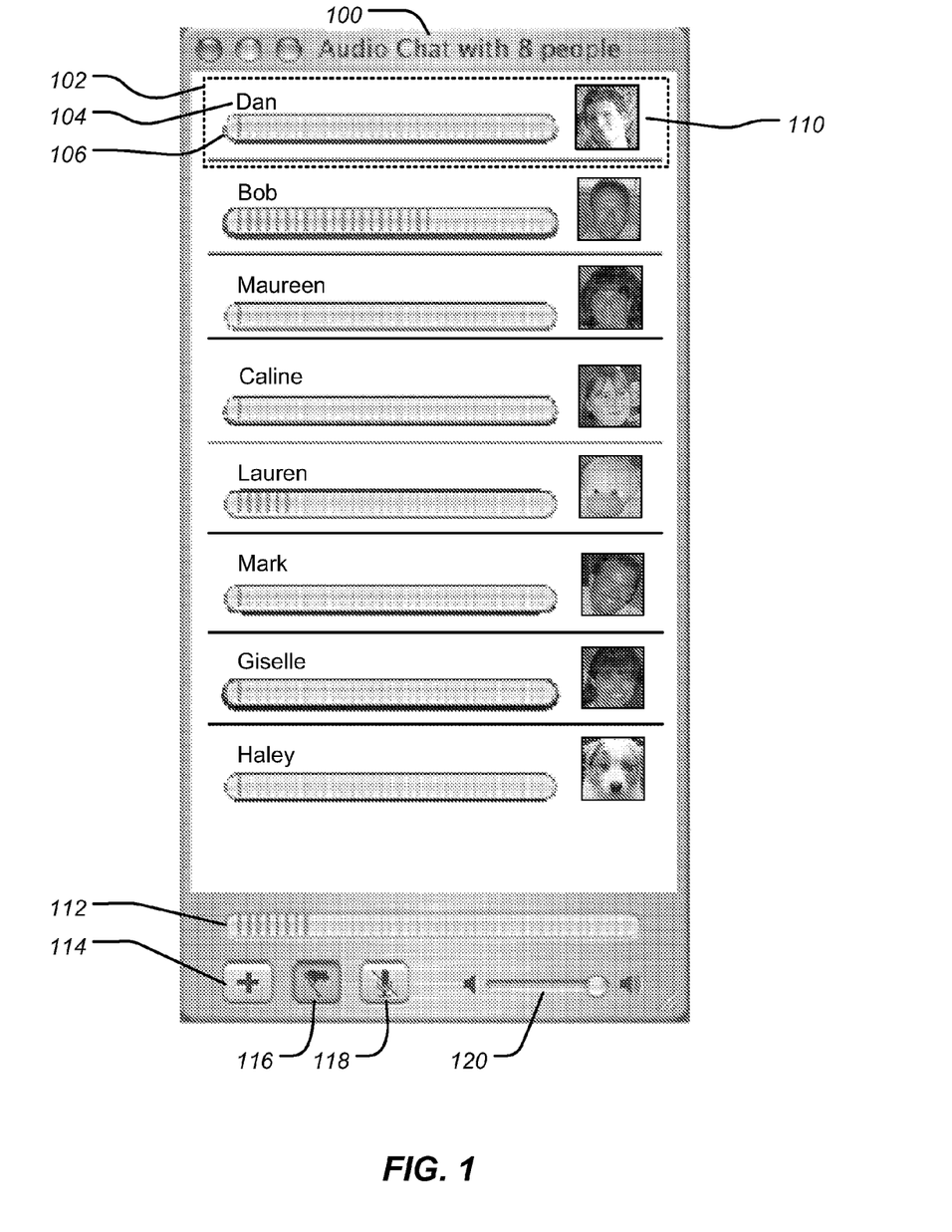
FIG. 1 is a user interface of an audio conferencing application.

Referring now to FIG. 1, a user interface 100 of an audio conferencing client application accordance with one embodiment of present invention is shown. The user interface 100 comprises a plurality of speaker areas 102, each one associated with a speaker (or participant) currently participating in an audio conferencing. Each participant in the conference has an instance of the audio conferencing client application executing on a respective computer. It is assumed for the purposes of this description that the audio conferencing clients have already setup and established a conferencing connection between the various computers of the participants, where each such computer executes an audio conferencing client in accordance with the present invention. Thus, in the example shown in FIG. 1, there are currently nine participants in the audio conference: the participant using the audio conferencing client application shown in FIG. 1, and the eight other participants represented by the eight speaker areas. Of course fewer or more participants can be represented (e.g., at least one participant, and a maximum defined by the connectivity capacity of the participants' various systems).

Within each speaker area 102 are various graphical elements. The name 102 (or other designation) of each other participant is listed, along with a participant icon 110. The icon is selected by the participant that is associated with the speaker area, and can be a photographic, other type of image, icon or text.

For each participant there is a graphical indicator of the speech activity of the participant. In the illustrated embodiment, the graphical indicator is audio signal level meter 106 that graphically indicates a current speech level of each other participant. The level meter has a minimum signal level on the far left (indicated by a single vertical level indicator) indicating that the participant is not speaking, and a maximum signal level on the far right. The signal level is shown by individual green (or other color) bars in the meter. Each bar indicates a 0.5 dB change in volume (with an the initial bar position after a 0 dB level indicating about a 30 dB signal level). The minimum signal level is set at about 40 dBA, to adjust for low levels of background noise that may be present in the participant's environment. The currently signal level is preferably determined using an A-weighted, slow response.

The audio signal level meter 106 allows the user to see which other participants are currently speaking, and which are the loudest or softest. This information is helpful to allow each participant to know who is talking, without relying on being able to identify each participant by voice alone. This is particularly helpful in large audio conferences where there are many speakers, and where the user will not always be able to identify each speaker, either for lack of familiarity or because of multiple speakers may be speaking at once. Thus, the audio signal level meter 106 provides useful non-verbal information that facilitates more natural turn taking.

This audio signal level meter 106 also provides a secondary non-verbal cue that is useful for turn taking, and that is the change in speech level of a speaker. Generally, as a person completes a speech utterance he tends to slightly lower the volume level of his voice. This cue is often hard to detect in audio conferencing due to bandwidth limitations and the signal processing used in audio compression. However, detecting the speech level automatically and displaying the audio signal level meter 106 visually to each participant—here by the decreasing number of the signal level indicators—gives each participant a visual, non-verbal indication as to when a speaker is about to finish talking, and facilitates turn taking and avoiding unnecessary interruptions of the current speaker.

The current participant (that is, the user viewing the interface 100 itself) also has a graphical indicator of his speech activity. In the illustrated embodiment, this is signal level meter 112 indicating the current volume of the user's voice. This allows the user to gauge or moderate the volume of his voice relative to other speakers.

In the illustration of FIG. 1, there are three participants currently speaking, Bob (who is speaking most loudly), Lauren, and the current user. The other participants are not speaking.

The audio conferencing client interface 100 also has a mute button 118 that allows each user to mute their microphone. A volume control slider 120 allows the user to adjust the speaker volume on their associated output equipment (e.g., desktop speakers coupled to their computer).

The add participant button 114 is used to add a participant to the audio conference. When selected, a drop down list (or other user interface gadget; not shown) is displayed to allow the user to identify one or more other participants to add to the conference. The audio conferencing client application receives the user selection and attempts to make the appropriate connection to the identified participants.

Figure 2:
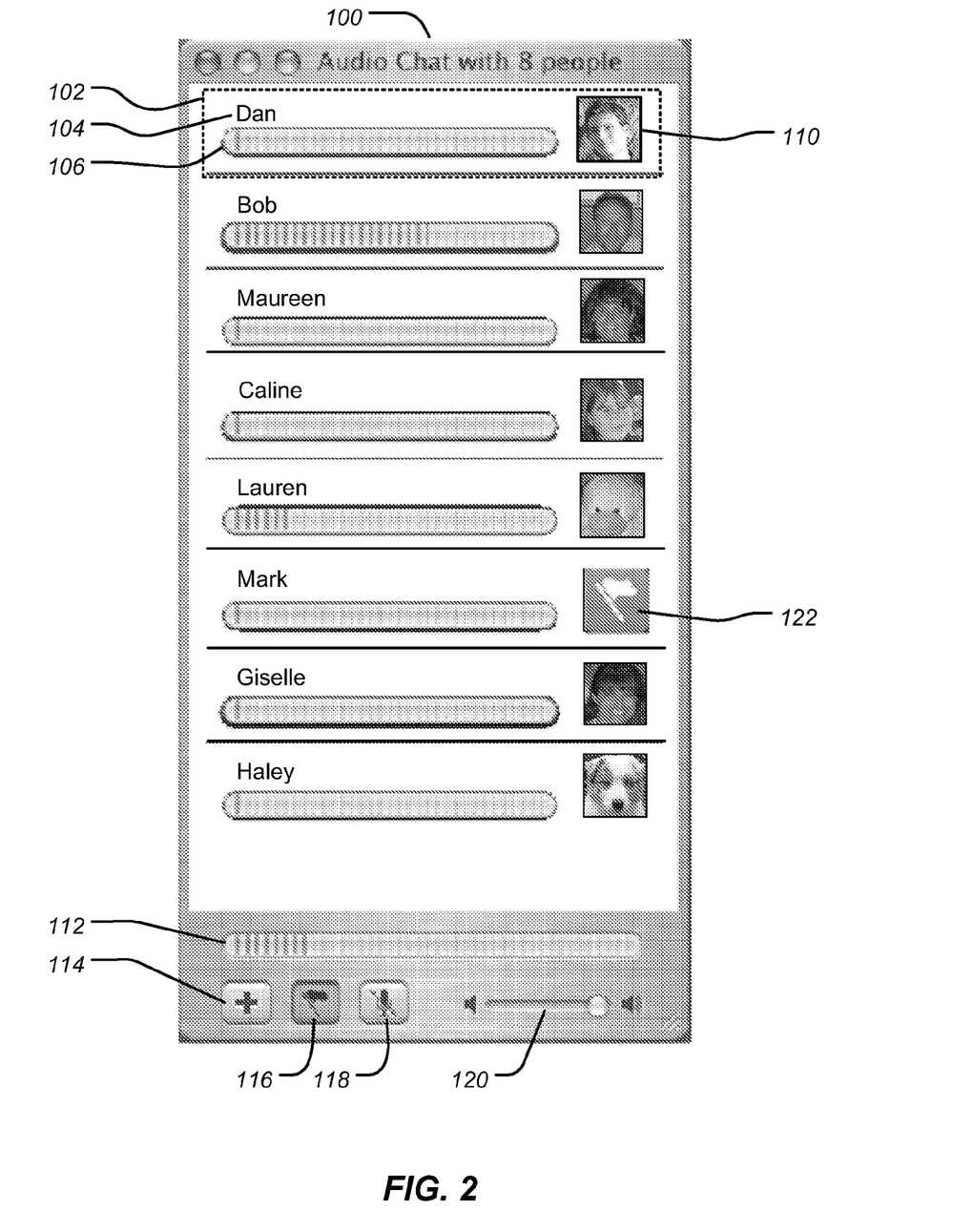
FIG. 2 is a further illustration of the user interface of the audio conferencing application, showing a request to speak icon.

The request to speak button 116 (or "flag button") is used to indicate that a user wishes to speak in the audio conference. Referring now to FIG. 2, when this button 116 is selected (e.g., clicked on with the, or activated by a key combination), this request is transmitted to the audio conferencing clients of other participants, as a request to speak indicator. In response to receiving a request to speak indicator, each audio conferencing client of the other participants then displays a request icon 122 (or "flag icon") in proximity to an identifier of the requesting participant. The identifier may be the participant's name 102, or the participant icon 110 for the requesting participant.

On the user interface of the requesting participant's audio conferencing client, the request button 116 appearance is changed to show that it is "pressed," and remains that way until the user cancels the request to speak, or starts speaking. In one embodiment, the user need not continue to hold the mouse down (or keystroke combination on the keyboard) in order to maintain the request icon 122 in place. In an alternative embodiment, the request icon 122 is displayed only so long as the user does hold down a mouse button or keystroke combination. In a third embodiment, the request icon 122 is displayed for a predetermined amount of time following the selection, for example, for 10 seconds, and then is removed. The flag icon 122 can fade out, say during the last 2 or 3 seconds of the predetermined interval. When request icon 122 is removed (or faded out) in the user's own audio conferencing client, the same effect appears in the user interfaces of all other participants' audio conferencing clients. Thus, these other participants know as well that a particular user's request to speak has either terminated or is about to (i.e., by observing the fading icon). This awareness of the state, or impending state of others' requests to speak provides further social cues for taking turns.

The user can increase duration of the request to speak by pressing the mouse button (or keystroke combination) again. Additionally, when the audio conferencing client receives a request to speak indicator, a low volume audio tone (or other sound effect) can be played to signal the request as well. This feature can be turned off individually by at each audio conferencing client. The use of an audio signal is particularly useful to alert the participant, since during an audio conference, the participant may be engage in other tasks (e.g., working in another computer application) and not viewing the user interface of the audio conferencing client.

In the example of FIG. 2, the remote speaker Mark has selected the request button 116 on his audio conferencing client application, and as a result, the request icon 122 shows in place of his participant icon 110 in each of the eight other audio conferencing client application user interfaces 100, including the one of the current speaker (illustrated in FIG. 1). This indicates to the current speaker (Bob), and the others participants that Mark would like to speak next. Bob can then moderate his volume, sum up his comments, etc. thus signal the end of his utterance; and Mark would then start talking when he felt it appropriate. It also allows the other participants to know that Mark would like to start speaking, and thus when Bob stops talking, they do not immediately start talking.

Figure 3:
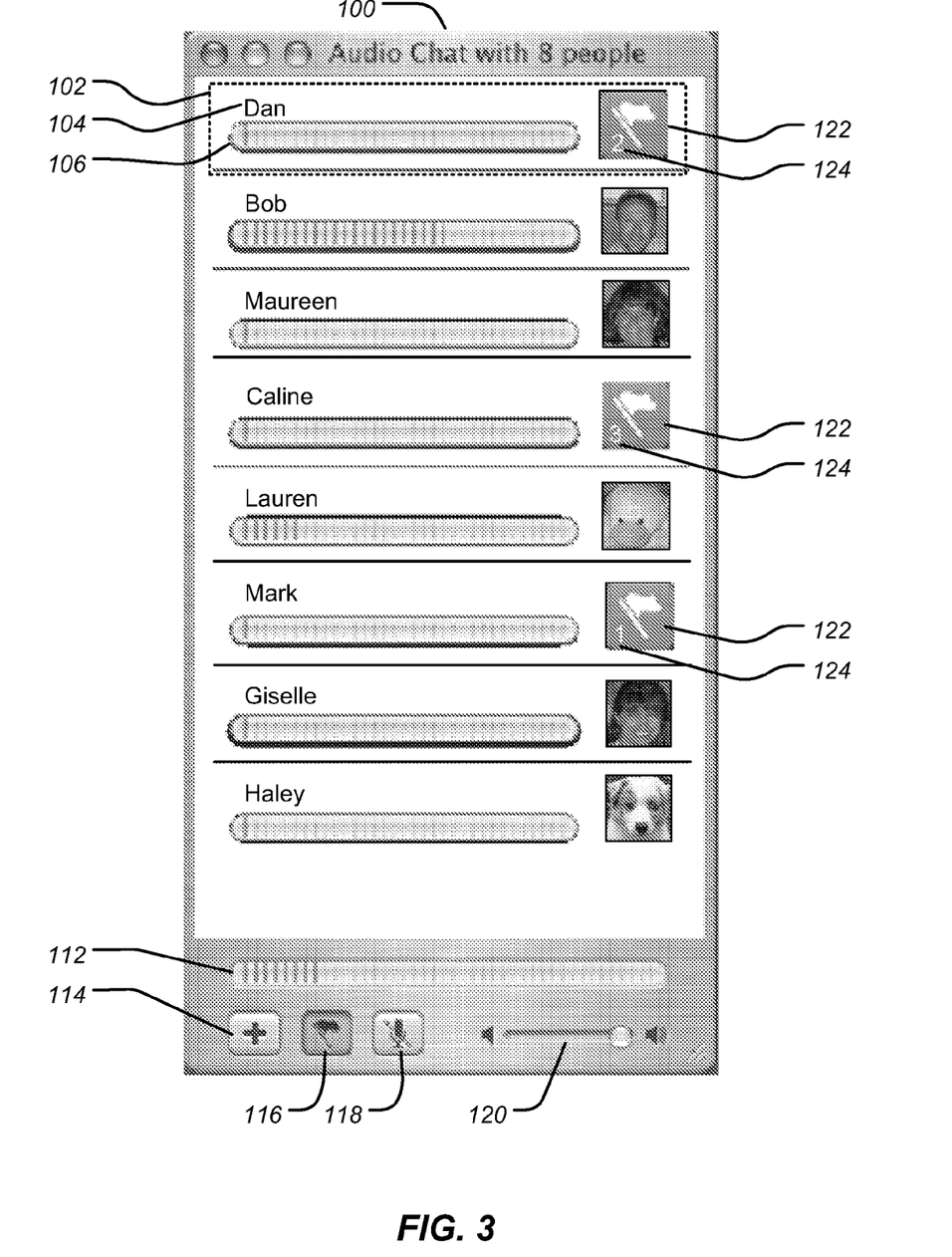
FIG. 3 is a further illustration of the user interface of the audio conferencing application showing multiple, numbered request to speak icons.

When several participants select their request buttons 116 (during any overlapping period of time, not necessarily simultaneously), then the order of the requests are visually indicated as well. FIG. 3 illustrates one embodiment, where the order of requests is indicated by request number 124 included next to the each request icon 122. In this illustrated example, the speakers Dan, Caline, and Mark have selected their request buttons 116, and the order of the request is shown with Mark's request being first, Dan's request being second, and Caline's request being third, as indicated by the respective number icons 124.

Once a participant starts speaking, the request icon 122 is removed. This is preferably done automatically, by the audio conferencing client itself, though it may be done manually by the user. To automatically remove the request icon 122, the audio conferencing client can detect when the volume of the user's voice exceeds a threshold level for a minimum length of time, for example, in excess of 60 dBA for 2 seconds. Those of skill in the art are familiar with the variety of speech detection algorithms, any of which may be used for this purpose.

Figure 4:
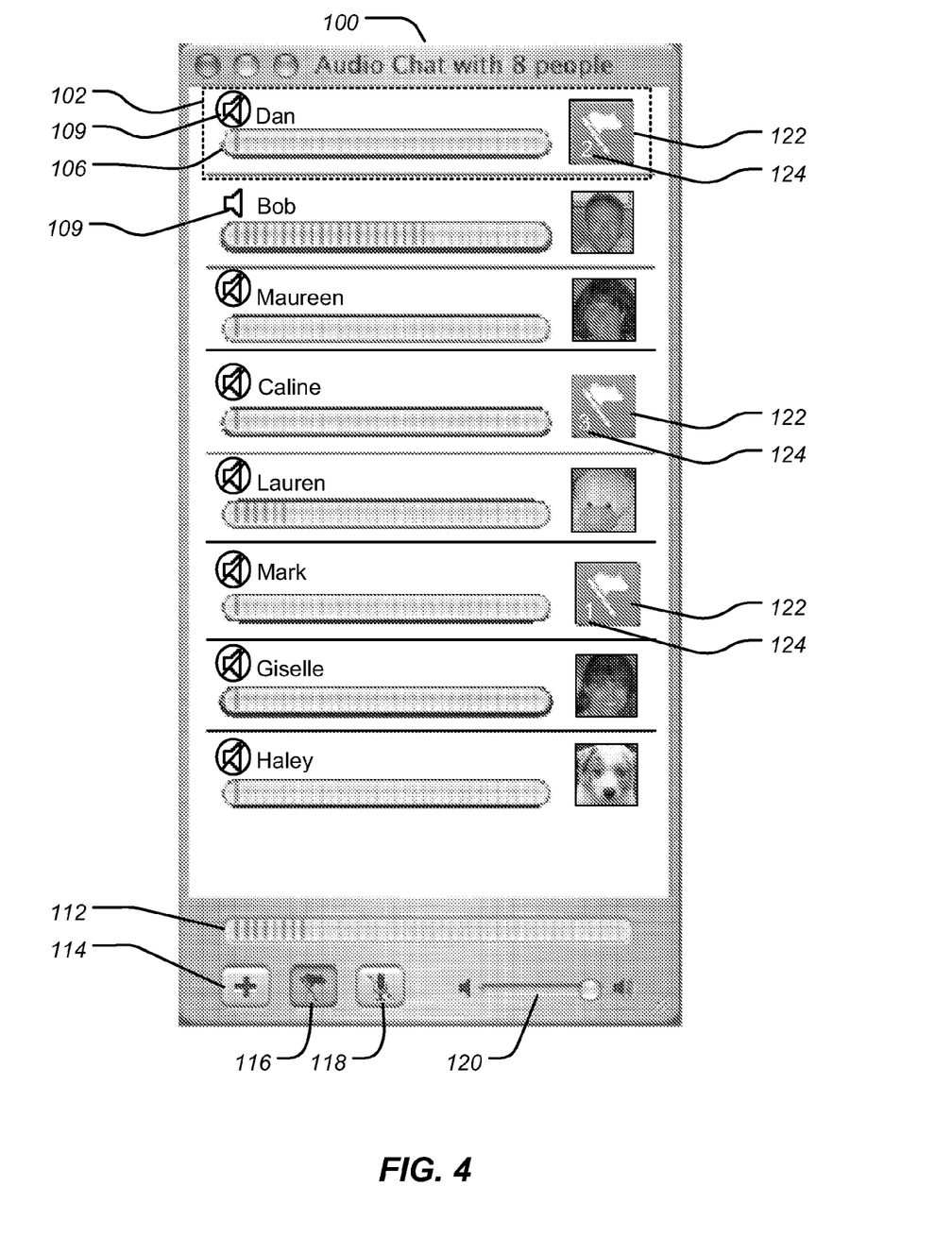
FIG. 4 is a further illustration of the user interface of the audio conferencing application in a moderated embodiment.

The foregoing embodiment is used in unmoderated conferences. An alternative embodiment of the present invention is useful in moderated environments. In a moderated environment, a host (by default the person initiating the conference, but may be otherwise) has control over who gets to speak by granting permission to speak, by enabling or disabling the audio output of the various participants' microphones. A user interface for this embodiment is shown in FIG. 4. Here, next to each participant's name is a speaker icon 109. For the current speaker (as designated by the moderator), the speaker icon 109 has a distinct state (e.g., as illustrated, or filled in with a solid color, surrounded by a distinct color field, etc.). The speaker icon 109 next to Bob indicates that he is the current speaker. For the other participants who are not permitted to speak, their speaker icons 109 have a different distinct appearance to connote a muted output. The distinct appearance may be as illustrated for the other participants (e.g., a speaker icon with a barred circle imposed over it) or filled with a different solid color, a different icon, etc. In conjunction with this embodiment showing the speaker icons, the request icons 112 of one or more participants are useful to signal to the participants and the moderator which participants desire to speak and thus, which order (as indicated by request number 124) the moderator can, but need not, enable the participants to speak, for example by selection of a participant via a menu or other user interface control. The moderator may enable more than one participant to speak at the same time.

The audio conferencing client provides the option to configure an audio conference as either moderated or unmoderated. This setup may be made at the time the conference is initiated, or may be made during the conference itself, thereby allowing a host to switch back and forth between a moderated and unmoderated conference.

One embodiment of an audio conferencing system using the audio conferencing client of the present invention is a peer-to-peer audio conferencing system, in which each audio conferencing client is responsible for performing the appropriate setup and connection maintenance operations for its own connection, and each audio conferencing client can establish a conference as a host with any number of other clients. A suitable peer-to-peer audio conferencing system, is provided by Apple Computer, Inc., by its iChat AV software, and in U.S. Pat. Nos. 5,444,709, 5,434,860, 5,572,582, 5,664,164, 5,854,898, 5,857,189, 5,864,678, 5,931,961, 6,189,034, 6,295,549, 5,920,732, 5,983,261, 6,175,856, 6,151,619, 5,973,724, 5,999,977, and the above reference application, all of which are incorporated by reference herein.

Generally, in an audio conferencing system using the audio conferencing clients of the present invention, each audio conferencing client provide state information pertaining to the state of its user interface and configuration to each of the other audio conferencing clients that are connected during an audio conference. This information is provided in-band via information packets that contain state information, parameters, and other coded values or signals. The state information reflects state changes, such as the state of the request to speak button 116, (which would indicate the request to speak), and where appropriate, the state of the speaker icon 109 (whether the moderator has muted a speaker). Each audio conferencing client keeps track of the state of these parameters with respect to the other participants who are connected to the audio conference, and makes the appropriate changes to its user interface 100, by placing or removing the request icon 122 where the other client has signaled that the user has requested to speak. Also, as additional participants make requests to speak, each audio conferencing client updates its own interface. As to the signal level meter 106, each audio conferencing client is responsible for updating its user interface by measuring the amplitude level of the received audio signals from each other audio conferencing client, and displaying the appropriate number of graphical indicators in the meter 106. In this peer-to-peer fashion, a centralized conferencing host is unnecessary, thereby reducing the cost and complexity of an audio conferencing system.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, the operations performed by the audio conferencing client refer to the actions and processes of a computer system, or similar electronic computing device, that manipulates and transforms data represented as physical (electronic) quantities within the computer system memories or registers or other such information storage, transmission or display devices in response to instructions that are encoded in a computer readable medium. Additionally, certain aspects of the present invention include process steps and instructions described herein in the form of an algorithm, the process steps and instructions of which could be embodied in software, firmware or hardware, and when embodied in software, could be downloaded to reside on and be operated from different platforms.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

We claim:

1. A user interface for an audio conferencing client application of a first participant, the audio conferencing client application executed by a computer to couple the application to an audio conference including an audio conferencing client application of at least one other participant, the user interface comprising:
   a first user interface element configured to indicate a request to speak by the first participant, the audio conferencing client application configured to transmit an indicator of the request to speak to the audio conferencing client of each other participant, the indicator configured to be transmitted separately from an audio signal of the first participant's speech; and
   for each other participant, a second user interface element configured to be displayed in proximity to an identifier of the other participant in response to the audio conferencing client application receiving an indicator of the request to speak by the other participant from the audio conferencing client application of the other participant the second user interface element configured to be displayed separately from an output of an audio signal of the other participant's speech.

2. The user interface of claim 1, where the user interface further comprises:
   a numerical indicator associated with each second user interface element that indicates an order in which the audio conferencing client application of the first participant received the indicators of the requests to speak from the audio conferencing client applications of the other participants.

3. The user interface of claim 1, wherein the second user interface element is a flag icon.

4. The user interface of claim 1, wherein the second user interface element is removed from the user interface in response to the other participant speaking.

5. The user interface of claim 1, wherein the second user interface element is removed from the user interface in response, at least in part, to the other participant speaking for a minimum amount of time.

6. The user interface of claim 1, wherein the second user interface element is removed from the user interface automatically after a predetermined amount of time.

7. The user interface of claim 1, wherein the second user interface element is removed from the user interface by fading the user interface element.

8. The user interface of claim 1, wherein the second user interface element is displayed in response to other the participant making a continuous user input via an input device, and is removed in response to the participant terminating the user input via the input device.

9. The user interface of claim 1, further comprising:
   for each other participant, a graphical indicator of speech activity of the other participant.

10. The user interface of claim 9, wherein the graphical indicator of speech activity is a graphical audio signal level meter configured to display a representation of a signal level of other participant's speech.

11. The user interface of claim 1, further comprising:
    a graphical indicator of speech activity of the first participant.

12. The user interface of claim 11, wherein the graphical indicator of speech activity is a graphical audio signal level meter configured to display a representation of a signal level of first participant's speech.

13. The user interface of claim 1, wherein the audio conferencing client application is configured to output an audio signal in response receiving from the audio conferencing client application of another participant an indicator of the request to speak by the other participant.

14. A computer implemented method of providing an audio conferencing between a plurality of audio conferencing client applications, including a first audio conferencing client application of a first participant, and at least one second audio conferencing client application of a second participant, the method comprising:
- receiving at the first audio conferencing client an indicator of a request to speak from the second audio conferencing client of the second participant, the indicator configured to be received separately from an audio signal of the second participant's speech;
- displaying in a user interface of the first audio conferencing client application, in proximity to an identifier of the second participant and in response to the received indicator, a user interface element indicating the second participant's request to speak;
- receiving at the first audio conferencing client, the audio signal comprising the second participant's speech; and
- outputting the received audio signal at the first audio conferencing client.

15. The method of claim 14, further comprising:
- receiving from a plurality of second audio conferencing client applications of second participants, a respective plurality of request to speak indicators, the indicators received in an order; and
- displaying in the user interface in association with each of the plurality of second participants, a numerical indicator associated with each user interface element that indicates the order in which the audio conferencing client application of the first participant received the indicators.

16. The method of claim 14, wherein the user interface element is a flag icon.

17. The method of claim 14, further comprising:
- removing the user interface element from the user interface in response to a second participant speaking.

18. The method of claim 14, further comprising:
- removing the user interface element from the user interface in response, at least in part, to a second participant speaking for a minimum amount of time.

19. The method of claim 14, further comprising:
- removing the user interface element from the user interface after a predetermined amount of time.

20. The method of claim 14, further comprising:
- removing the user interface element from the user interface by fading the user interface element.

21. The method of claim 14, wherein the user interface element is displayed in the user interface in response to a second participant making a continuous user input via an input device, and is removed from the user interface in response to the second participant terminating the user input via the input device.

22. The method of claim 14, further comprising:
- for each second participant, displaying a graphical indicator of speech activity of the second participant.

23. The method of claim 22, wherein the graphical indicator of speech activity is a graphical audio signal level meter configured to display a representation of a signal level of second participant's speech.

24. The method of claim 14, further comprising:
- displaying a graphical indicator of speech activity of the first participant.

25. The method of claim 24, wherein the graphical indicator of speech activity is a graphical audio signal level meter configured to display a representation of a signal level of first participant's speech.

26. The method of claim 14, further comprising:
- outputting an audio signal in response receiving from a second audio conferencing client application of a second participant an indicator of the request to speak by the second participant.

27. A computer system for audio conferencing an audio conferencing client application of a first participant to an audio conference including an audio conferencing client application of a plurality of other participants, the system comprising:
- a computer configured to execute an audio conferencing client application, the audio conferencing client application configured to display a first user interface element to indicate a request to speak by the first participant, the audio conferencing client application configured to transmit an indicator of the request to speak to an audio conferencing client application of the second participant, the indicator configured to be transmitted separately from an audio signal of the first participant's speech to the audio conferencing client applications of the other participants, and further configured to display for each other participant, a second user interface element in proximity to an identifier of the other participant in response to the audio conferencing client application receiving from the audio conferencing client application of the other participant an indicator of the request to speak by the other participant, the second user interface element configured to be displayed separately from an output of an audio signal of the other participant's speech.

28. A computer program product, comprising a computer readable medium storing computer executable instructions for producing a user interface for an audio conferencing client application of a first participant, the audio conferencing client application executed by a computer to couple the application to an audio conference including an audio conferencing client application of at least one other participant, the user interface comprising:
- a first user interface element configured to indicate a request to speak by the first participant, the audio conferencing client application configured to transmit an indicator of the request to speak to the audio conferencing client of each other participant, the indicator configured to be transmitted separately from an audio signal of the first participant's speech; and
- for each other participant, a second user interface element configured to be displayed in proximity to an identifier of the other participant in response to the audio conferencing client application receiving an indicator of the request to speak by the other participant from the audio conferencing client application of the other participant, the second user interface element configured to be displayed separately from an output of an audio signal of the other participant's speech.

29. The computer program product of claim 28, where the user interface further comprises:
- a numerical indicator associated with each second user interface element that indicates an order in which the audio conferencing client application of the first participant received the indicators of the requests to speak from the audio conferencing client applications of the other participants.

30. The computer program product of claim 28, wherein the second user interface element is a flag icon.

31. The computer program product of claim 28, wherein the second user interface element is removed from the user interface in response to the other participant speaking.

32. The computer program product of claim 28, wherein the second user interface element is removed from the user interface in response, at least in part, to the other participant speaking for a minimum amount of time.

33. The computer program product of claim 28, wherein the second user interface element is removed from the user interface automatically after a predetermined amount of time.

34. The computer program product of claim 28, wherein the second user interface element is removed from the user interface by fading the user interface element.

35. The computer program product of claim 28, wherein the second user interface element is displayed in response to other the participant making a continuous user input via an input device, and is removed in response to the participant terminating the user input via the input device.

36. The computer program product of claim 28, further comprising:
    for each other participant, a graphical indicator of speech activity of the other participant.

37. The computer program product of claim 36, wherein the graphical indicator of speech activity is a graphical audio signal level meter configured to display a representation of a signal level of other participant's speech.

38. The computer program product of claim 28, further comprising:
    a graphical indicator of speech activity of the first participant.

39. The computer program product of claim 38, wherein the graphical indicator of speech activity is a graphical audio signal level meter configured to display a representation of a signal level of first participant's speech.

40. The computer program product of claim 28, wherein the audio conferencing client application is configured to output an audio signal in response receiving from the audio conferencing client application of another participant an indicator of the request to speak by the other participant.

41. A computer program product, comprising a computer readable medium storing computer executable instructions for providing an audio conferencing between a plurality of audio conferencing client applications, including a first audio conferencing client application of a first participant, and at least one second audio conferencing client application of a second participant, the method comprising:
    receiving at the first audio conferencing client an indicator of a request to speak from the second audio conferencing client of the second participant, the indicator configured to be received separately from an audio signal of the first participant's speech;
    displaying in a user interface of the first audio conferencing client application, in proximity to an identifier of the second participant and in response to the received indicator, a user interface element indicating the second participant's request to speak;
    receiving at the first audio conferencing client, an audio signal comprising the second participant's speech; and
    outputting the received audio signal at the first audio conferencing client.

42. A user interface for an audio conferencing client application of a first participant, the audio conferencing client application executed by a computer to couple the application to an audio conference including an audio conferencing client application of at least one other participant, the user interface comprising:
    a first user interface element configured to indicate a request to speak by the first participant, the audio conferencing client application configured to transmit an indicator of the request to speak to the audio conferencing client of each other participant, the indicator configured to be transmitted with an audio signal of the first participant's speech; and
    for each other participant, a second user interface element configured to be displayed in proximity to an identifier of the other participant in response to the audio conferencing client application receiving an indicator of the request to speak by the other participant from the audio conferencing client application of the other participant, the second user interface element configured to be displayed separately from an output of an audio signal of the other participant's speech.

43. The user interface of claim 1, wherein the second user interface element indicates association with the other participant requesting to speak.

44. A user interface for an audio conferencing client application of a first participant, the audio conferencing client application executed by a computer to couple the application to an audio conference including an audio conferencing client application of at least one other participant, the user interface comprising:
    a request to speak icon configured to indicate a request to speak by the first participant, the audio conferencing client application configured to transmit an indicator of the request to speak to the audio conferencing client of each other participant, the indicator configured to be transmitted with an audio signal of the first participant's speech;
    for each other participant, a request icon in proximity to an identifier of the first participant in response to the audio conferencing client application receiving from the audio conferencing client application of the first participant an indicator of the request to speak, the request icon configured to be displayed in addition to the output of an audio signal of the first participant's speech; and
    for each other participant, the request icon associated with the first participant being configured to be removed once the first participant starts speaking.

45. A computer implemented method of providing an audio conferencing between a plurality of audio conferencing client applications, including a first audio conferencing client application of a first participant, and at least one second audio conferencing client application of a second participant, the method comprising:
    receiving at the first audio conferencing client an indicator of a request to speak from the second audio conferencing client of the second participant and the audio signal comprising the second participant's speech;
    displaying in a user interface of the first audio conferencing client application, in proximity to an identifier of the second participant and in response to the received indicator, a user interface element indicating the second participant's request to speak; and
    outputting the received audio signal at the first audio conferencing client.

* * * * *